United States Patent [19]

Nozawa et al.

[11] 4,383,743
[45] May 17, 1983

[54] WATER-PROOF CAMERA

[75] Inventors: Hideyo Nozawa, Ohmiya; Toshio Dobashi, Kawasaki, both of Japan

[73] Assignee: Nippon Kogaku K.K., Tokyo, Japan

[21] Appl. No.: 246,217

[22] Filed: Mar. 23, 1981

Related U.S. Application Data

[63] Continuation of Ser. No. 87,789, Oct. 24, 1979, abandoned.

[30] Foreign Application Priority Data

Oct. 27, 1978 [JP] Japan .................. 53-147020[U]
Apr. 6, 1979 [JP] Japan .......................... 54-41037

[51] Int. Cl.³ ............................................ G03B 17/08
[52] U.S. Cl. ..................................................... 354/64
[58] Field of Search ............... 354/64, 288; 220/326, 220/344

[56] References Cited

U.S. PATENT DOCUMENTS

| | | | |
|---|---|---|---|
| 3,358,574 | 12/1967 | Liverano | 354/288 |
| 3,459,323 | 8/1969 | Boothman | 354/288 X |
| 3,602,121 | 8/1971 | Ernisse | 354/212 |
| 3,831,182 | 8/1974 | Shimizu | 354/64 |
| 4,110,770 | 8/1978 | Lange | 354/288 X |
| 4,149,793 | 4/1979 | Date | 354/288 X |

FOREIGN PATENT DOCUMENTS 1494866  12/1977  United Kingdom .

OTHER PUBLICATIONS

Richter, H. U., "Unterwasser-Fotografie and Fernsehen", 1958.

Primary Examiner—John Gonzales
Attorney, Agent, or Firm—Fitzpatrick, Cella, Harper & Scinto

[57] ABSTRACT

A water-proof camera comprises a camera body, a back lid rotatably supported on one side of the camera body, an elastic water-proof member disposed at a marginal area which requires water-proof integrity between the camera body and the back lid, and a back lid locking device positioned on the other side of the camera body when the back lid is closed.

5 Claims, 8 Drawing Figures

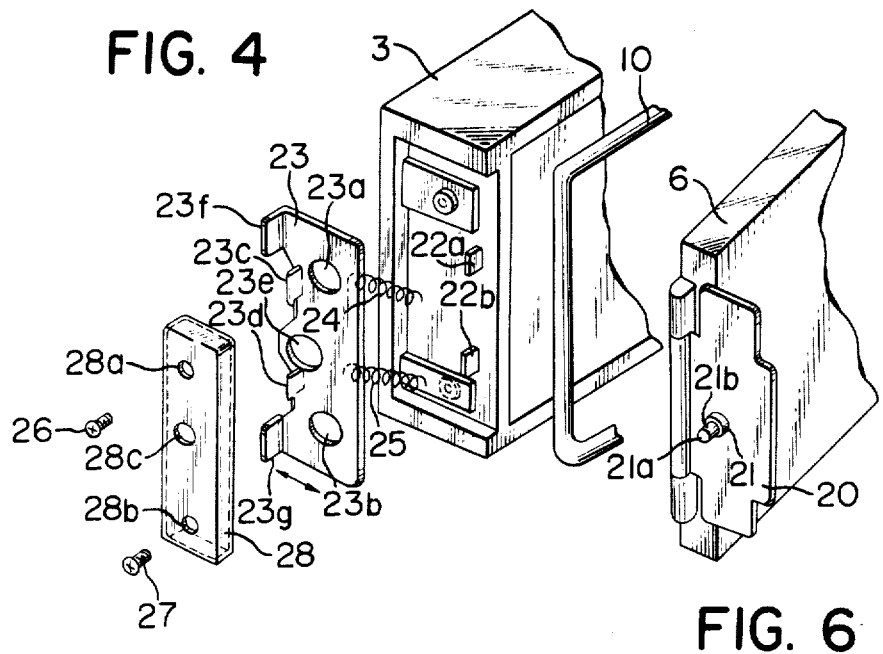
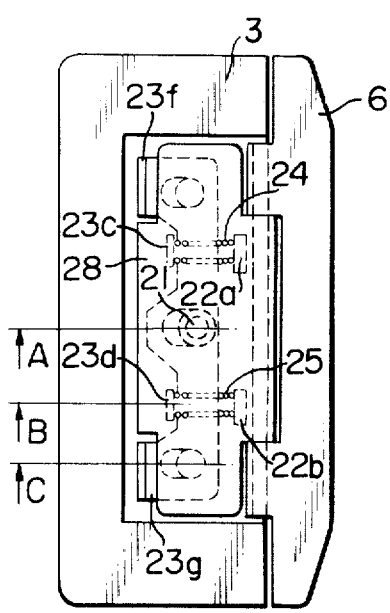
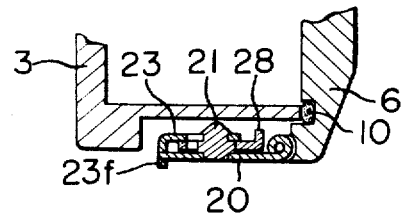
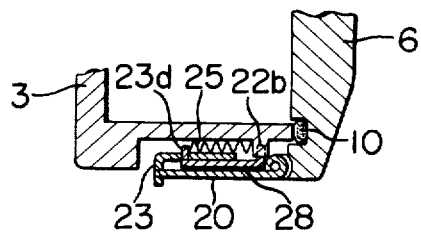
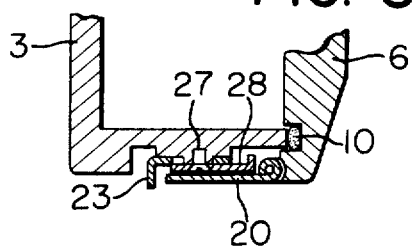

WATER-PROOF CAMERA

This is a continuation of application Ser. No. 87,789, filed Oct. 24, 1979, now abandoned.

BACKGROUND OF THE INVENTION

1. Field of the Invention

This invention relates to a water-proof camera of the type in which a hinge type back lid is opened when a film is loaded and is closed after the film has been loaded, and more particularly to such a water-proof camera having a water-proof device which provides, during the closing of the back lid, crushing tolerance in thrust direction to an elastic water-proof packing acting to water-proof the back lid.

2. Description of the Prior Art

Heretofore, loading of a film into a water-proof camera has been accomplished by taking the mechanism portion of the camera body out of the housing of the camera body instead of opening and closing a hinge type back lid as when a film is loaded into an ordinary camera. Of course, the coupling portion therebetween is provided with a water-proof packing. Accordingly, the procedure of loading a film into a water-proof camera is very cumbersome as compared with the case of the ordinary cameras and therefore, it is desired in the water-proof camera that a film can be loaded by opening and closing the hinge type back lid which is easy to manipulate. In this case, however, water-proof means becomes a problem to be considered. On the other hand, an O-ring is usually used as the water-proof means in a water-proof camera. As the manner of using such O-ring, it is usual to use it while holding it down in radial direction. In this case, oil must be used for the O-ring and this leads to a disadvantage that the O-ring becomes swollen due to the oil or that due to degeneration of the oil, a great force is required to take the mechanism portion of the camera body out of the housing of the camera body or that the O-ring becomes distorted by taking in and out of the mechanism portion of the camera body and the service life of the O-ring is shortened. As a manner of using an O-ring which is intended to overcome these disadvantages, there may be mentioned an example in which the O-ring is used while being held down in thrust direction. In such case, the O-ring must be pushed with a predetermined force to provide for a crushing tolerance of the O-ring. For this purpose, U.S. Pat. No. 3,831,182 discloses a water-proof camera which includes a hinge type back lid openable and closable with respect to the camera body, an auxiliary back lid and an elastic member disposed therebetween and wherein when the hinge type back lid is closed, the elastic member biases the auxiliary back lid toward the camera body side, as a result of which an O-ring is held down in thrust direction between the auxiliary back lid and the camera body.

However, in this prior art, the hinge type back lid and the auxiliary back lid are formed as a double structure and this leads to a disadvantage that the thickness of the camera body is increased when the back lid is closed or that during the opening of the back lid, the elastic member may be plastically deformed by the auxiliary back lid being pulled or pushed out by mistake with a result that the back lid cannot be closed or that the O-ring cannot be held down in the thrust direction expected in the stage of design.

SUMMARY OF THE INVENTION

It is an object of the present invention to provide an entirely novel type of water-proof device for holding down an elastic water-proof packing in thrust direction so as to enable the elastic water-proof packing to be used while being held down in thrust direction in a water-proof camera having a hinge type back lid.

The water-proof camera according to the present invention comprises a camera body, a back lid covering the back side of said camera body, said back lid being rotatably supported on one side of said camera body to enable loading of a film, said back lid rendering the back side of said camera body capable of being opened and closed, an elastic water-proof member disposed at a marginal area which requires water-proof integrity between said camera body and said back lid and sandwiched between said camera body and said back lid at least when said back lid is closed, and a back lid locking device including a biasing member deformable between a first form and a second form, a member for deforming said biasing member from said first form into said second form in response to the operation of locking said back lid in closed position, and means for converting the force of restitution of said biasing member from said second form to said first form into a force for holding down said elastic member in a predetermined direction in which said back lid is directed toward said camera body after completion of the operation of locking said back lid and for cooperating with the biasing member to lock said back lid in closed position, said back lid locking device being positioned on the other side of said camera body when said back lid is closed.

Said locking device holds down the elastic water-proof member in thrust direction chiefly on one side of the back lid, namely, on that side which retains the back lid, but on the other side of the back lid, namely, on that side which is adjacent to the center of rotation thereof, the camera body and the back lid form a hinge mechanism so that, if the position of the center of rotation of the back lid is accurately determined and firmly fixed, the elastic water-proof member can be held down in thrust direction only by the closing of the back lid. It should be noted here that converting and cooperating means performs two functions by the force of restitution of the biasing member and as the result, the entire camera may be made compact and such trouble as loss of water-proof integrity which may result from the user's carelessness can be reduced.

Further, as a preferred embodiment of the water-proof camera according to the present invention, there may be mentioned an arrangement in which a member for supporting said back lid rotatably with respect to the camera body is slidably supported with respect to the camera body and said supporting member is biased so as to hold down said elastic water-proof member against the camera body when said back lid is closed. This embodiment provides more complete hold-down of the elastic water-proof member in thrust direction on that side which is adjacent to the center of rotation of the back lid.

The invention will become more fully apparent from the following detailed description thereof taken in conjunction with the accompanying drawings.

BRIEF DESCRIPTION OF THE DRAWINGS

FIG. 4 is a perspective view showing another embodiment of the present invention.

FIG. 5 is a side view of the FIG. 4 embodiment.

FIGS. 6, 7 and 8 are cross-sectional views taken along arrows A, B and C, respectively, of FIG. 5.

DESCRIPTION OF THE PREFERRED EMBODIMENTS

Figure 1:
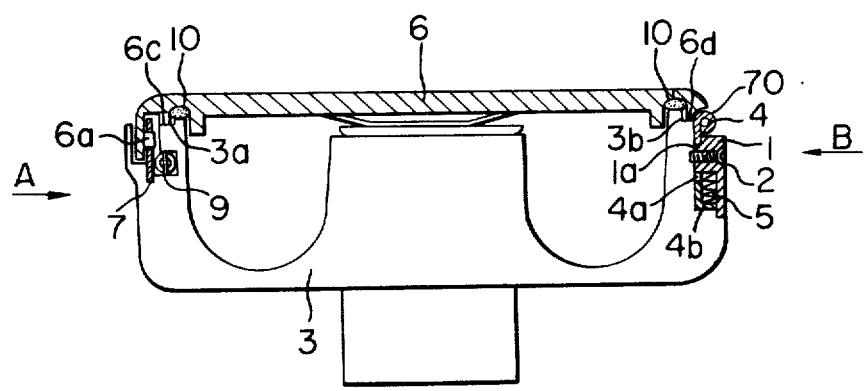
FIG. 1 is a cross-sectional view of an embodiment of the present invention.
Figure 2:
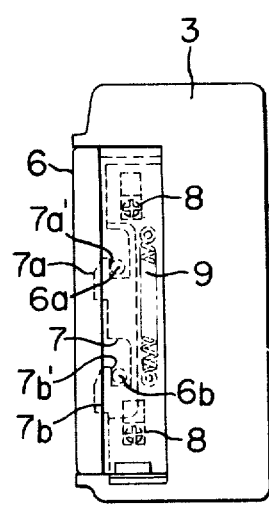
FIG. 2 is a side view as seen along arrow A of FIG. 1.
Figure 3:
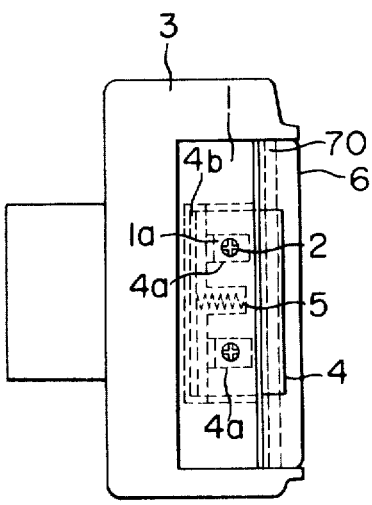
FIG. 3 is a side view as seen along arrow B of FIG. 1.

Referring to FIGS. 1–3, a cover 1 having a guide projection 1a is secured to a camera body 3 by screws 2. A slidable hinge 4 having translation grooves 4a fitted over the guide projection 1a and a riser portion 4b may be guided by the guide projection 1a between the camera body 3 and the cover 1 and is slidable up and down as viewed in FIG. 1. A biasing member 5 such as a spring is disposed between the cover 1 and the riser portion 4b of the slidable hinge 4 to bias the slidable hinge 4 downwardly as viewed in FIG. 1, namely, in a direction to urge a back lid 6 against the camera body 3. One end of the hinge type back lid 6 is rotatable about a hinge shaft 70 supported by the slidable hinge 4. Locked pins 6a and 6b are studded in the other end of the hinge type back lid 6.

A locking plate 7 is guided vertically as viewed in FIG. 2 (in the direction of the height of the camera) by guide pins 8 studded in the camera body, and is biased upwardly as viewed in FIG. 2 by a biasing member 9 such as a spring. The locking plate 7 is provided with two retaining portions 7a and 7b corresponding to the locked pins 6a and 6b. These retaining portions 7a and 7b are formed with right ramps (cams) 7a' and 7b' for pressing the locked pins 6a and 6b rightwardly as viewed in FIG. 2 (downwardly as viewed in FIG. 1), namely, in a direction to urge the back lid 6 against the camera body, when the hinge type back lid 6 is closed and the locking plate 7 is biased upwardly as viewed in FIG. 2 by a biasing member 9. The elements 7–9 together constitute a locking device.

An elastic water-proof packing 10 such as an O-ring configured along the peripheral edge of the back lid 6 is disposed between the camera body 3 and the back lid 6 so that it is pressed in thrust direction by these when the hinge type back lid 6 is closed. The strength of the biasing members 5 and 9 is set so that, when the back lid 6 is closed, they press the packing 10 with a predetermined force to provide a suitable crushing tolerance and prevent water leakage even at normal pressure. The framing surfaces 3a, 3b of the camera body 3 and the framing surfaces 6c, 6d of the back lid 6 are engaged with one another when external pressure exceeds a predetermined value, thus preventing permanent deformation of the packing 10. Operation will now be described. When the back lid 6 is rotated to bring it from its open position to its closed position, the locked pins 6a and 6b become engaged with the left ramps (unnumbered) of the corresponding retaining portions 7a and 7b. When the back lid 6 is further rotated from this position, the locked pins 6a and 6b depress the retaining lever 7 downwardly along the left ramps of the retaining portions 7a and 7b, as viewed in FIG. 2, against the force of the biasing member 9. When the locked pins ride over the retaining portions 7a and 7b, they come into recesses (unnumbered). Since the retaining portions 7a and 7b are provided with the right ramps 7a' and 7b', the locked pins 6a and 6b are moved rightwardly as viewed in FIG. 2 by the upward sliding movement of the retaining lever 7 corresponding to the restitution of the biasing member 9 toward its original position. Thus, the packing 10 sandwiched between the back lid 6 and the camera body 3 is urged in thrust direction. On the other hand, the back lid 6 is subjected to the biasing force of the biasing member 5 through the rotary shaft 7 and the slidable hinge 4 and therefore, when the back lid 6 is closed, the packing 10 is held down between the back lid 6 and the camera body 3 by such biasing force. In this manner, the packing 10 is given a crushing tolerance.

Of course, the structure of the back lid 6 is such that the pressure force exerted on the packing 10 is substantially uniformly provided to the entire packing. Even when water pressure is exerted, the packing 10 is pressed in a direction in which it is further collapsed by the water pressure, thereby preventing water leakage. To open the back lid 6, the locking plate 7 may be pulled downwardly against the force of the biasing member 9, as viewed in FIG. 2.

The elements 1–5 are not always necessary. It is because, since the back lid 6 and the camera body 3 constitute a hinge mechanism when the back lid 6 is simply supported for rotation relative to the camera body 3, the intended effect may be obtained even by holding down the packing adjacent to the center of rotation of the back lid between the back lid 6 and the camera body 3 when the back lid 6 is closed and by fixing the position of the rotary shaft of the back lid 6 so as to provide a suitable crushing tolerance.

Another embodiment of the present invention will now be described.

Referring to FIGS. 4–8, the hinge type back lid 6 is provided with an auxiliary hinge 20 operable during the opening-closing of the back lid. A locked pin 21 having a tapered portion (cam) 21a and a strut portion 21b is studded in the auxiliary hinge 20.

Projections 22a and 22b are provided on the camera body 3. A locking plate 23 has guide slots 23a, 23b, bent portions 23c, 23d, a locking groove 23e for receiving therein the locked pin 21, and operating portions 23f, 23g. A spring 24 is compressedly supported between the projection 22a and the bent portion 23c, and a spring 25 is compressedly supported between the projection 22b and the bent portion 23d. These springs 24 and 25 act to bias the locking plate 23 leftwardly as viewed in the drawing.

A screw 26 is threaded into the camera body 3 through a hole 28a in a cover 28 and the slot 23a, and a screw 27 is threaded into the camera body 3 through a hole 28b in the cover 28 and the slot 23b. Thus, the locking plate 23 is slidable in the direction of the arrow by being guided by the screws 26, 27 and the slots 23a, 23b. Of course, the locking plate 23 is normally biased leftwardly as viewed in the drawing by the springs 24 and 25. The cover 28 is provided with a hole 28c formed in opposed relationship with the locking groove 23e and into which the locked pin 21 is forced when the back lid 6 is closed.

To close the back lid 6, the auxiliary hinge 20 may be clockwisely rotated to force the locked pin 21 into the locking groove 23e through the hole 28c. Thereupon, the tapered portion 21a of the pin 21 bears against the end of the locking plate 23 which forms the locking groove 23e and by the force-in operation, this tapered portion 21a causes the locking plate 23 to slide rightwardly against the forces of the springs 24 and 25, as viewed in the drawing. When the tapered portion 21a fully comes into the back side of the locking plate 23 in the vicinity of the end of the force-in operation, the locking plate 23 slides leftwardly until it bears against the strut 21b by the biasing forces of the springs 24 and 25. When the locking plate 23 bears against the strut 21b, the back lid 6 is subjected to the biasing forces of the springs 24 and 25 through the pin 21 and the auxiliary hinge 20. These biasing forces are the forces which press the water-proof packing 10.

The slidable hinge 4, hinge shaft, etc. at one end of the back lid are similar to those shown in FIG. 1 and therefore are not shown. To open the back lid, the operating portions 23f and 23g may be manually pushed rightwardly as viewed in FIG. 4 and in such state, the locking plate 20 may be rotated counter-clockwisely to withdraw the pin 21 from the groove 23e and the hole 28c.

We claim:

1. A water-proof camera comprising:
 (a) a camera body;
 (b) a back lid adapted to cover the back side of the camera body;
 (c) means for rotatably supporting a side end of the back lid at a side end of the camera body so that the back lid may be closed and opened, the supporting means having a first biasing means for biasing the back lid toward the front of the camera body;
 (d) an elastic water-proof member disposed at a marginal area which requires water-proof integrity between the camera body and the back lid and sandwiched between the camera body and the back lid by closure of the back lid;
 (e) a retaining member fixed at a second side end of said back lid;
 (f) a locking member provided at a second side end of the camera body to be movable between a first position and a second position, the locking member having a cam provided with a first portion and a second portion with which said restraining member is brought into contact; and
 (g) a second biasing means disposed between the camera body and the locking member, the second locking member storing its energy in response to the displacement of the locking member from the first position to the second position which displacement is caused by co-operation of the restraining member with the first portion of the cam upon closure of the back lid, and the restoring force of the second biasing means being converted to a force for biasing the back lid toward the front of the camera body by co-operation of the restraining member with the second portion of the cam,
 whereby when the back lid is closed the elastic water-proof member is compressed by the first and second biasing means in the thrust direction between the camera body and the back lid biased toward the front of the camera body.

2. A camera according to claim 1, wherein the supporting means include a slidable hinge supported at a side end of the camera body for sliding reciprocal movement and which supports rotatably the back lid so that the back lid may be opened and closed; and said slidable hinge is biased toward the front of the camera body by said first biasing means.

3. A water-proof camera comprising:
 (a) a camera body;
 (b) a back lid adapted to cover the back side of the camera body;
 (c) supporting means for rotatably supporting the back lid at a side end of the camera body so that a side end of the back lid may be opened and closed;
 (d) an elastic water-proof member disposed in a marginal area which requires water-proof integrity between the camera body and the back lid and sandwiched between the camera body and the back lid by closure of the back lid, the water-proof member being depressed in its thrust direction between the back lid and the camera body in the neighborhood of said rotatably supporting means when the back lid is closed;
 (e) an auxiliary hinge rotatably supported at a second side end of the back lid, the auxiliary hinge having a restraining member;
 (f) a locking plate supported slidably to a second end of the camera body;
 (g) means for biasing the locking plate toward the camera body, the biasing means being deformable between a first form and a second form;
 (h) cam means fixed to the restraining member and adapted to cam said locking plate to sliding movement thereby to deform the biasing means from the first form to the second form in association with rotation of the auxiliary hinge for locking the back lid after closure of the back lid,
 whereby, after rotational movement of the auxiliary hinge, the restraining member is brought into contact with the locking plate so that the restoring force of the biasing means from the second form to the first form causes the elastic water-proof member to be compressed in the thrust direction between the back lid and the camera body.

4. A water-proof camera comprising:
 (a) a camera body;
 (b) a back lid adapted to cover the back side of the camera body;
 (c) supporting means for rotatably supporting a side end of the back lid to a side end of the camera body, the supporting means including a slidable hinge supported at the side end of the camera body for sliding movement in reciprocal directions relative to the camera body and rotatably supporting the back lid so that the back lid may be opened and closed and a biasing means for biasing the slidable hinge toward the front of the camera body;
 (d) an elastic water-proof member disposed in a marginal area which requires water-proof integrity between the camera body and the back lid and sandwiched between the camera body and the back lid by closure of the back lid;
 (e) an auxiliary hinge rotatably supported at the other side end of the back lid, the auxiliary hinge having a restraining member;
 (f) a locking plate slidably supported at the other end of the camera body;
 (g) means for biasing the locking plate toward the camera body, the biasing means being deformable between a first form and a second form;
 (h) cam means fixed to the restraining member and adapted to cam said locking plate to sliding movement thereby to deform the biasing means from the first form to the second form in association with rotation of the auxiliary hinge for locking the back lid after closure of the back lid, whereby, after rotational movement of the auxiliary hinge, the restraining member is brought into contact with the locking plate so that the restoring force of the biasing means from the second form to the first form causes the elastic water-proof member to be compressed in the thrust direction between the back lid and the camera body.

5. A water-proof camera comprising:
(a) a camera body;
(b) a back lid adapted to cover the back side of the camera body;
(c) supporting means for rotatably supporting a first side end of the back lid at a side end of the camera body so that a second side end of the back lid may be opened and closed;
(d) an elastic water-proof member disposed in a marginal area which requires water-proof integrity between the camera body and the back lid by closure of the back lid;
(e) an auxiliary hinge rotatably supported at a second side end of the back lid;
(f) biasing means deformable between a first form and a second form, the biasing means being deformed from the first to the second form when the auxiliary hinge is rotated toward the camera body after closure of the back lid; and
(g) means for engaging the auxiliary hinge with the camera body by rotational movement of the auxiliary hinge so that the restoring force of the biasing means from the second form to the first form causes the elastic water-proof member to be compressed between the back lid and the camera body.

* * * * *